United States Patent [19]
Tokumaru et al.

[11] Patent Number: 4,914,261
[45] Date of Patent: Apr. 3, 1990

[54] CABLE CONNECTING BOX

[75] Inventors: Yuzo Tokumaru, Kanagawa; Hideo Satou; Kunio Kobayashi, both of Aichi, all of Japan

[73] Assignees: Sumitomo Electric Industries, Ltd., Osaka; Chubu Telecommunications Company Inc., Nagoya, both of Japan

[21] Appl. No.: 240,204

[22] Filed: Sep. 6, 1988

[30] Foreign Application Priority Data

Sep. 3, 1987 [JP] Japan .............................. 62-136097[U]

[51] Int. Cl.$^4$ ...................... H02G 15/113; G02B 6/24
[52] U.S. Cl. ................................. 174/92; 174/65 R; 174/77 R; 350/96.2
[58] Field of Search ................ 174/92, 77 R, 65 R; 350/96.2

[56] References Cited

U.S. PATENT DOCUMENTS

| 1,977,774 | 10/1934 | Osborne | 174/92 |
|---|---|---|---|
| 2,803,696 | 8/1957 | Hefner | 174/92 |
| 4,216,351 | 8/1980 | Brandeau | 174/92 |
| 4,428,645 | 1/1984 | Korbelak et al. | 350/96.20 |
| 4,558,174 | 12/1985 | Massey | 174/92 |
| 4,673,246 | 6/1987 | Schembri | 350/96.2 X |
| 4,708,430 | 11/1987 | Donaldson et al. | 350/96.2 |
| 4,752,653 | 6/1988 | Bachel et al. | 174/93 |
| 4,753,499 | 6/1988 | Malkani et al. | 350/96.2 |
| 4,754,876 | 7/1988 | Noon et al. | 350/96.2 X |
| 4,840,449 | 6/1989 | Ghandeharizadeh | 350/96.2 |

FOREIGN PATENT DOCUMENTS

| 39756 | 1/1929 | Denmark | 174/65 R |
|---|---|---|---|
| 0219072 | 4/1987 | European Pat. Off. | |
| 233697 | 3/1986 | German Democratic Rep. | 174/92 |
| 12607 | 2/1981 | Japan | 350/96.21 |
| 108815 | 7/1982 | Japan | 350/96.2 |
| 74516 | 4/1984 | Japan | 350/96.2 |
| 233698 | 5/1986 | Japan | 174/92 |
| 2189660 | 10/1987 | United Kingdom | |

Primary Examiner—Morris H. Nimmo
Attorney, Agent, or Firm—Cushman, Darby & Cushman

[57] ABSTRACT

A cable connecting box for accommodating and protecting the connecting portion of cables in narrow spaces while allowing any branch cables to be led out in a free direction from the cable conecting box. The structural arrangement of the cable connecting box has the following features: (1) an opening is formed at one side wall of a two-split case whereby the longer side edges of the opening are facing each other in the depthwise direction of the case; (2) a core plate of an elastic material which fits between the casing halves seals the casing water-tight; (3) a plurality of cable receptacles are formed between the core plate and each of the casing halves by combining the semicircular grooves of the core plate with the semicircular grooves which are formed in the longer side edge of the opening in a manner to face the former semicircular grooves.

5 Claims, 3 Drawing Sheets

4,914,261

CABLE CONNECTING BOX

BACKGROUND OF THE INVENTION

1. Field of the Invention

The invention relates to a cable connecting box suited for accommodating and protecting the connecting portion of optical cables or the like especially in a narrow space such as a hand hole.

2. Description of the Prior Art

A well-known cable connecting box is constructed, as shown in FIGS. 7 and 8, such that a casing 20 is composed of an outer cylinder 21 assembled by connecting two sleeve halves with bolts, and two end plates 22 closing the two ends of the outer cylinder 21. The core connecting portion J of cables A are linearly connected in the water-tight casing 20.

One disadvantage of this cable connecting box is that if the aforementioned linear cable connecting portion is mounted in a narrow space, such as a hand hole, it is incapable of allowing its branch cable to be led out in a free direction. This is because it is difficult to maintain the curvature of a branch cable A' more than its allowable radius of curvature, as indicated by broken lines in FIG. 7.

Moreover, since the linear cable connecting portion has no excess length to be led out from the mounting space, it is difficult to accomplish the connection in such narrow space. Also, if a branch cable is added in the future, the end plates cannot be disassembled without serious difficulty.

SUMMARY OF THE INVENTION

In order to overcome the above-mentioned problems, the present invention provides a new structural arrangement for a connecting box. The structural arrangement of the present invention has the following features: (1) there is formed at one side wall of a two-split case an opening whereby its longer side edges are facing each other in the depth-wise direction of the case; (2) the casing is sealed water-tight by a core plate of an elastic material fitting between the casing halves; and (3) a plurality of cable receptacles are formed between the core plate and each of the casing halves by combining the semicircular grooves of the core plate and the semicircular grooves which are formed in the longer side edge of the opening in a manner to face the former semicircular grooves.

The cable receptacles are arranged in parallel between the core plate and each of the casing halves so that a plurality of cables can be confined in the small space.

Since all the cables are led in one direction into the connecting box, the connecting work can be accomplished outside of the site. Moreover, the space for accommodating the bent cable portion can be reduced to about one half of the prior art, and the cable gripping members can be gathered at one place to shorten the case. Thus, the connecting box can increase the degree of freedom for its arrangement.

Finally, because the cable receptacles are opened in the semicircular shape merely by removing the casing halves, the work of introducing, extracting and additionally mounting the cables can be facilitated.

DETAILED DESCRIPTION OF THE PREFERRED EMBODIMENT

FIGS. 1–4 show a first embodiment of the present device.

Figure 1:
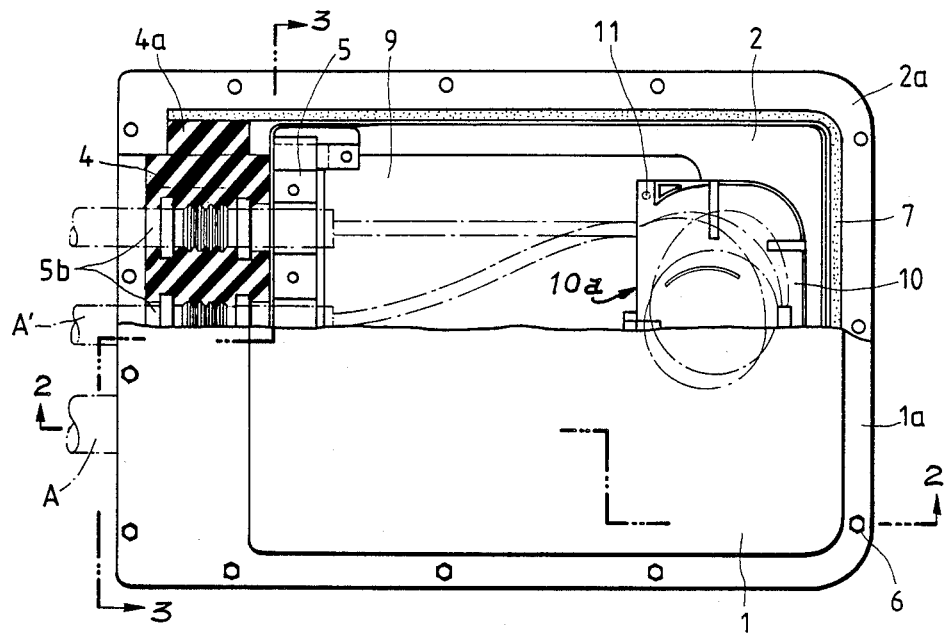
FIG. 1 is a top plan view showing one embodiment of the present device with its upper casing half removed.
Figure 2:
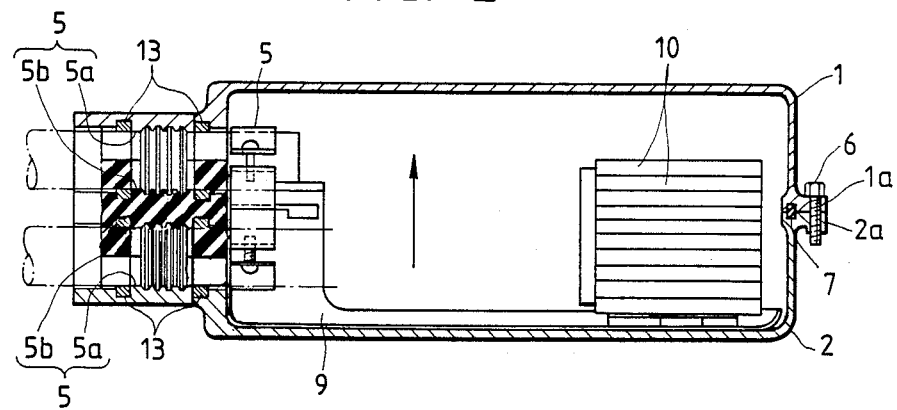
FIG. 2 is a section taken along line II—II of FIG. 1.
Figure 3:
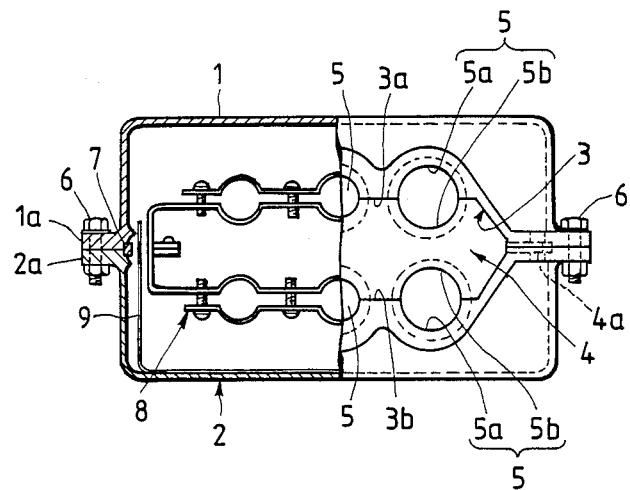
FIG. 3 is a view showing the left hand side of FIG. 1 in half section.

In FIGS. 1, 2 and 3, rectangular casing halves 1 and 2 are provided, and are flanged at 1a and 2a with common shape and size. An opening 3 is formed at one side wall of the case between the casing halves 1 and 2. The opening 3 has its longer side edges 3a and 3b facing each other in the depth-wise direction (as indicated by arrows in FIG. 3) and extending in parallel with each other. Semicircular grooves 5a are formed in casing halves 1 and 2 to extend along the individual opening edges 3a and 3b from the outside to the inside of the case. The grooves 5a are radially enlarged at two middle portions for fitting sealing washers 13.

Figure 4:
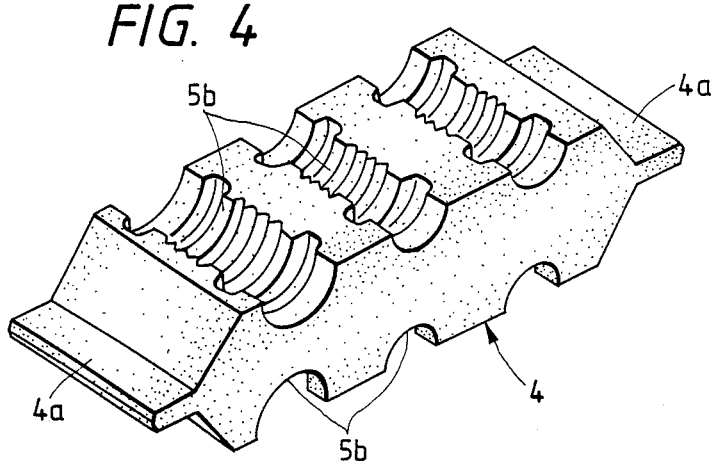
FIG. 4 is a perspective view showing the core plate.

A core plate 4 is made of soft rubber, and plugs opening 3 water-tight. As shown in FIG. 4, core plate 4 has its two end projections 4a fitted in the corresponding recesses of the case to prevent the end projections 4a from coming out. Moreover, core plate 4 is formed with semicircular grooves 5b in its sides to abut against the longer side edges 3a and 3b in a manner to correspond to the aforementioned semicircular grooves 5a. The latter semicircular grooves 5b are also radially enlarged for fitting sealing washers 13 at their positions corresponding to the radially enlarged positions of the grooves 5a.

Cable receptacles 5 are defined by combining the facing semicircular grooves 5a and 5b. The two upper and lower cable receptacles 5 located at the right hand side of FIG. 3 are made larger for the main cables whereas the remaining cable receptacles 5 are made smaller for the branch cables.

Bolt-nuts 6 fasten casing halves 1 and 2 through flanges 1a and 2a. A gasket 7 is compressed between the abutting faces of casing halves 1 and 2. Cable fixing fittings 8 are disposed to correspond to the individual cable receptacles. An inner frame 9 is fitted in the casing half 2. An excess cable tray 10 supports and accommodates the connected portions and excess portions of the cable cores entering through the front side 10a of excess cable tray 10 on built-in holders and spacers in a stacked form. The excess cable tray 10 is fixed in position on inner frame 9 through a plurality of slide pins 11 which are anchored upright on inner frame 9. The aforementioned cable fixing fittings 8 are also supported at their two ends on inner frame 9.

Casing halves 1 and 2 may be made to have different shapes, but the production cost can be dropped by the mass-production effect if they have the common shape.

Considering the productivity of the case, core plate 4 and cable fixing fittings 8, it is desirable that the longer side edges 3a and 3b of opening 3 be also in parallel, as shown in FIG. 3.

Figure 5:
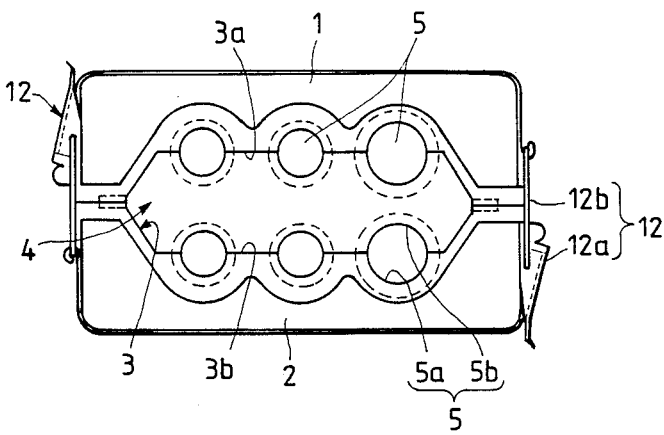
FIG. 5 is a side elevation showing another embodiment.

FIG. 5 shows another embodiment of the invention, whereby the casing halves 1 and 2 are joined by means of fasteners 12. Each of these fasteners 12 is constructed by attaching a hinged ring 12b having a turn lever 12a to one of the casing halves 1 or 2 and by retaining a cam lock (not shown) united with the turn lever 12a on a retainer (not shown) which is mounted on the other casing half. The advantage of fasteners 12 is that the time required for connecting and disconnecting optical fiber cables is reduced.

The connection of optical fiber cables by using the connecting box thus exemplified will be described in the following.

First, upper casing half 1 and core plate 4 are removed from lower casing half 2. The two sealing washers 13 are fitted in position on the cable sheath, and a sealing material is wound between the two washers 13. Then, the sheath end of the cable (not shown) is fixed in the fixing portion of the lower row of the cable fixing fitting 8.

Next, the cable thus fixed is inserted into semicircular groove 5a of casing half 2 such that the sealing washers 13 are snugly fitted in the larger-diameter portion of semicircular groove 5a. Plugs (not shown) are fitted into any semicircular grooves left unused.

The core plate 4 is then fitted into the casing halves 1 and 2 such that the leading portion of the lower-row cable and the remaining semicircle of the plug are enclosed, and the upper-row cable is then likewise treated. After this, the optical fiber cores are connected, and the connected portion and the excess portion are confined in the excess cable tray 10. These trays 10 are accommodated in casing half 2, which is then covered by the upper casing half 1 such that the upper-row cable is snugly fitted in the semicircular grooves of core 4 and the casing half 1. These upper and lower casing halves 1 and 2 are fastened to each other by means of the aforementioned bolt-nuts 6 or fastener 12.

After this fastening is completed, gasket 7 and the core plate 4 having its two end projections contacting with the gasket are compressed to establish sealing effects in the interface between casing halves 1 and 2, and in the interface between the cable receptacles 5 and the bases (and the plugs) so that the connecting box is sealed up. It has been experimentally confirmed that this sealing effect has prevented the invasion of water even after the connecting box is dipped in water for one year.

Figure 6A:
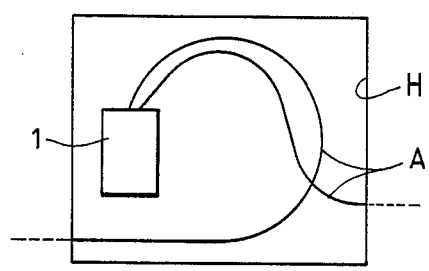
FIG. 6(a), 6(b) and 6(c) are diagrams showing the examples of the arrangement pattern of the connecting box.
Figure 6B:
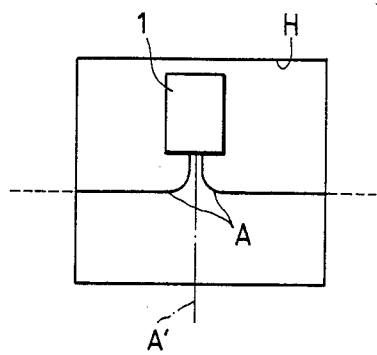
Figure 6C:
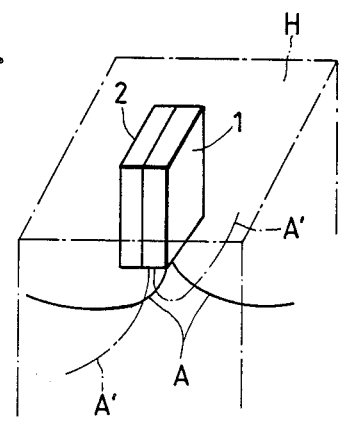
Figure 7:
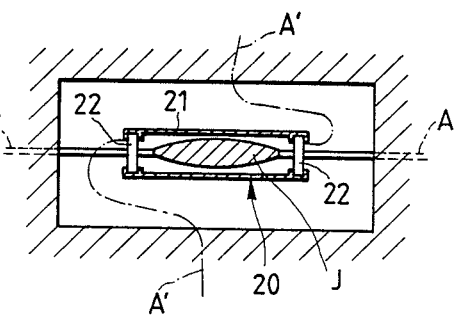
FIG. 7 is a top plan diagram showing the used state of the connecting box of the prior art in section.
Figure 8:
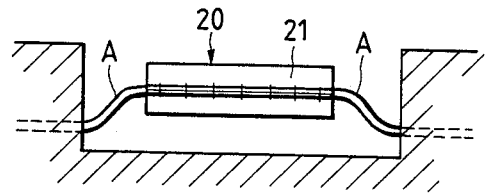
FIG. 8 is a side diagram of the same prior art shown in FIG. 7.

FIG. 6 presents an example of the arrangement of the connecting box in a hand hole H. FIGS. 6(a) and 6(b) are top plan diagrams showing the arrangement in which casing half 1 is overlaid, and FIG. 6(c) is a perspective diagram showing the arrangement in which core plate 4 is underlaid. Thus, the connecting box of the present device receives the cables A and A' in one direction so that its mounting direction can be freely changed in accordance with the connecting conditions of the cables. For the same reasoning, the connecting works can be accomplished with the connecting box being extracted to the outside of the site so that the workability can be substantially improved. For example, six cables were introduced into the exemplified connecting box, and this connecting box was introduced into and extracted from the hand hole having a width of 400 mm, a height of 900 mm and a length of 800 mm. This work has revealed that the connecting box could be promptly assembled and disassembled without any trouble.

According to the present invention, the connecting box receives a plurality of cables in parallel from its one side wall by the use of the core plate. Thus, it is possible to enhance the space efficiency of the cable receptacles and the degree of freedom for changing the mounting direction, to connect the cables outside of the site and additionally mount the branch cables, to open the individual cable receptacles in the semicircular shape merely by removing the casing halves, and to shorten the case length by gathering the cable fixing fittings at one position. There can be attained an effect that the workability can be improved without any trouble even in a narrow space such as the hand hole.

The present invention is effective for connecting communication cables or optical cables and especially for the branching connections in the narrow space.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A cable connecting box for holding a cable comprising:

a first and second case half, each said case half having an opening surface, said opening surface corresponding on each said first and second case half so that said opening surface on said first case half faces said corresponding opening surface on said second case half in a depth-wise direction relative to said case, said opening surfaces being parallel to each other, the connection of said first and second case halves thereby forming an opening;

a core plate disposed between said first and second case halves, said core plate having first and second surfaces, said first surface abutting said opening surface of said first case half and said second surface abutting said opening surface of said second case half, thereby forming a plurality of cable receptacles between said first case half and said core plate, and between said second case half and said core plate when said first and second case half are connected;

means for supporting and accommodating connected and excess portions of any cables within said connecting box, said cables entering and exiting through a front side of said supporting and accommodating means; and means for fastening said first and second case halves to one another so as to form a water tight seal between said first case half and said second case half.

2. A cable connecting box for holding a cable comprising:

a first and second case half, each said case half having an opening surface, said opening surface corresponding on said first and second case halves so that said opening surface on said first case half faces said corresponding opening surface on said second case half in a depth-wise direction relative to said case, said opening surfaces being parallel to each other, the connection of said first and second case halves thereby forming an opening, each said first and second case halves having semicircular grooves extending along said opening surface from an outside surface, of each case half to an inside of each case half;

a core plate disposed between said first and second case halves, said core plate having first and second surfaces, said first surface abutting said opening surfaces of said first case half and said second surface abutting said opening surface of said second case half, thereby forming a plurality of cable receptacles between said first case half and said core plate, and between said second case half and said core plate when said first and second case halves are connected, said core plate also having semicircular grooves corresponding on said first and second case half, said semicircular grooves of said first and second case half and said core plate being adapted to accommodate a plurality of sealing washers adapted to fit on a cable, thereby forming a water-tight seal between said cable and said connecting box;

means for supporting and accommodating said connected and excess portions of any cables within said connecting box; and means for fastening said first and second case halves to one another so as to form a water-tight seal between said first case half and said second case half.

3. A cable connecting box as recited in claim 2, wherein said supporting and accommodating means comprises an excess cable tray having built-in holders, whereby said connected and excess portions of any cables within the box are supported and accommodated in a stacked form.

4. A cable connecting box as recited in claim 3, wherein said fastening means comprises:
   a flange disposed on the periphery of the opening surface of each first and second case half, said flanges having a corresponding shape and size; and
   a plurality of bolt nuts located on connecting said flanges on each first and second case half with sufficient compression to thereby form a water-tight seal.

5. A cable connecting box as recited in claim 3, wherein said fastening means comprises a hinged ring connected to said first case half; and
   a turn lever attached to said second case half, said hinged ring rotatively attached to said turn lever.

* * * * *